United States Patent
Shin et al.

(10) Patent No.: US 8,319,837 B2
(45) Date of Patent: Nov. 27, 2012

(54) METHOD FOR SHARING FILE BETWEEN CONTROL POINT AND MEDIA SERVER IN A DLNA SYSTEM, AND SYSTEM THEREOF

(75) Inventors: Ho-Chul Shin, Suwon-si (KR); Won-Shik Yoon, Suwon-si (KR); Chul-Seung Kim, Seoul (KR)

(73) Assignee: Samsung Electronics Co., Ltd (KR)

( * ) Notice: Subject to any disclaimer, the term of this patent is extended or adjusted under 35 U.S.C. 154(b) by 225 days.

(21) Appl. No.: 12/691,395

(22) Filed: Jan. 21, 2010

(65) Prior Publication Data

US 2010/0182437 A1  Jul. 22, 2010

(30) Foreign Application Priority Data

Jan. 21, 2009 (KR) .................... 10-2009-0005016

(51) Int. Cl.
*H04N 5/225* (2006.01)
(52) U.S. Cl. ..................................... 348/207.1
(58) Field of Classification Search ............... 348/207.1
See application file for complete search history.

(56) References Cited

U.S. PATENT DOCUMENTS

| | | |
|---|---|---|
| 2004/0239765 A1 | 12/2004 | Kuromatsu |
| 2004/0263631 A1 | 12/2004 | Brittan et al. |
| 2007/0211734 A1 | 9/2007 | Yang et al. |
| 2007/0288748 A1* | 12/2007 | Kakiuchi et al. ............. 713/159 |
| 2008/0133697 A1 | 6/2008 | Stewart et al. |
| 2008/0158612 A1* | 7/2008 | Iwasaki ........................ 358/3.26 |

FOREIGN PATENT DOCUMENTS

WO    WO 2007/113462    10/2007

OTHER PUBLICATIONS

Roman et al., "A Wireless Web for Creating and Sharing Personal Content through Handsets", IEEE Persuasive Computing, vol. 4, No. 2, Apr. 1, 2005.
Monaghan et al., "Automating Photo Annotation using Services and Ontologies", 7th International Conference on Mobile Data Management, May 10, 2006.

* cited by examiner

*Primary Examiner* — Sinh Tran
*Assistant Examiner* — Mark Monk
(74) *Attorney, Agent, or Firm* — The Farrell Law Firm, P.C.

(57) ABSTRACT

A method for sharing a file between a control point and a media server in a DLNA system, and a system thereof are provided, in which the control point captures a photo, determines a similarity between a facial image included in the captured photo and a facial image file corresponding to at least one media server, compares the similarity with a pre-stored value, and if the similarity is greater than or equal to the pre-stored value, transmits a Uniform Resource Identifier (URI) representing a position at which the photo is stored to the media server, and the media server accesses the URI received from the control point and receives the photo using the URI.

16 Claims, 4 Drawing Sheets

METHOD FOR SHARING FILE BETWEEN CONTROL POINT AND MEDIA SERVER IN A DLNA SYSTEM, AND SYSTEM THEREOF

PRIORITY

This application claims priority under 35 U.S.C. §119(a) to a Korean Patent Application filed in the Korean Patent and Trademark Office on Jan. 21, 2009 and assigned Serial No. 10-2009-0005016, the entire disclosure of which is hereby incorporated by reference.

BACKGROUND OF THE INVENTION

1. Field of the Invention

The present invention relates to a method for sharing a file between a control point and a media server in a Digital Living Network Alliance (DLNA) system, and a system thereof.

2. Description of the Related Art

DLNA operates in compliance with the IEEE 802.3i and 802.3u standards for general network connectivity and in compliance with the IEEE 802.11a/b/g standard for wireless connectivity. A network layer uses Internet Protocol version 4 (IPv4) and a media transport layer uses HyperText Transfer Protocol (HTTP). DLNA is based on a middleware Universal Plug and Play (UPnP) that uses protocols such as Internet Protocol (IP), Transmission Control Protocol (TCP), User Data Protocol (UDP), HTTP, and eXtensible Markup Language (XML). UPnP is characterized in that it independently enables commands and control between devices on a network of a specific operation system, programming language, and medium.

The UPnP Audio and Video (AV) standard defines four services: Content Directory service, Connection Manager server, Rendering Control service, and AV Transport service.

The Connection Manager service enables a control point to use and manage the relationship between a content source and a content sync in selecting a format and a protocol. The control point refers to a device capable of detecting and controlling other devices. With the Connection Manager service, the control point does not need to have knowledge of a physical media connection technology and selects a source and a sync to render the source.

The Rendering Control service controls audio and video characteristics. Most rendering devices provide for the setting of attributes that affect content rendering. The Rendering Control service provides a control point with a function of controlling these rendering attributes.

The AV Transport service controls playback and recoding. The AV Transport service provides a mechanism for a control point to control transmission of audio and video streams by tasks such as Play, Stop and Pause.

The Content Directory service provides a list of content and metadata. The Content Directory service is used as a control point to search for and store audio and video content. This service might be used to display a list of songs stored on an MP3 player, still images comprising various slide shows, movies stored in a DVD jukebox, TV shows, etc. In addition, the Content Directory service describes a method for dynamically generating thumbnails for images and efficiently rendering the thumbnails in a control point or a media renderer. In DLNA, the thumbnails are provided mainly in an independent media format such as JPEG_TN or PNG_TN.

Along with the proliferation of digital cameras and mobile phones, most users take photos with their mobile phones or digital cameras. After taking photos, the photos are stored in a mobile storage medium such as a Secure Digital (SD) card, a Compact Flash (CF) card, a Universal Serial Bus (USB), a Compact Disc (CD), etc., or the photos are uploaded to the Web.

A user, which has taken photos using a mobile phone or the like, selectively determines with whom to share the photos. To share the photos, the user copies a photo file of the photos to a device of another user or transmits the photo file to the device of the other user. At the moment the user takes a photo, the photo is not shared with another user. The user is generally required to search through photo files stored in a digital camera or a mobile phone one by one in order to transmit a photo to another user. Thus, it is difficult to physically share the photo with another user. If the user intends to share a photo with a few persons, the photo sharing may be easy. However, to share a photo with a number of persons, the user needs to transmit the photo to each of them individually. Accordingly, there exists a need for a method and apparatus for facilitating a photo to be shared between users.

SUMMARY OF THE INVENTION

An aspect of embodiments of the present invention is to address at least the problems and/or disadvantages described above and to provide at least the advantages described below. Accordingly, an aspect of embodiments of the present invention is to provide a method for sharing a file between a control point and a media server in a DLNA system, and a system thereof.

In accordance with an aspect of the present invention, a method for sharing a file between a control point and a media server in a DLNA system is provided, in which a photo is compared by the control point, a similarity between a facial image included in the captured photo and a facial image file corresponding to at least one media server is determined by the control point, the similarity is compared with a pre-stored value by the control point, if the similarity is greater than or equal to the pre-stored value, a Uniform Resource Identifier (URI) representing a position at which the photo is stored is transmitted to the media server by the control point, the URI received from the control point is accessed by the media server, and the photo is received using the URI by the media server.

In accordance with another aspect of the present invention, A DLNA system is provided, in which a control point has a capturer, determines, when a photo is captured by the capturer, a similarity between a facial image included in the captured photo and a facial image file corresponding to at least one media server, compares the similarity with a pre-stored value, and if the similarity is greater than or equal to the pre-stored value, transmits a URI representing a position at which the photo is stored to the media server, and the at least one media server receives the URI from the control point and accesses the photo using the URI.

In accordance with a further aspect of the present invention, a method for sharing a file with a media server in a control point in a DLNA system, in which a photo is captured through a capturer, a similarity between a facial image included in the captured photo and a facial image file corresponding to at least one media server is determined, the similarity is compared with a pre-stored value, and if the similarity is greater than or equal to the pre-stored value, a URI representing a position at which the photo is stored is transmitted to the media server.

BRIEF DESCRIPTION OF THE DRAWINGS

The above and other objects, features and advantages of certain embodiments of the present invention will be more apparent from the following detailed description taken in conjunction with the accompanying drawings, in which.

Throughout the drawings, the same drawing reference numerals will be understood to refer to the same elements, features and structures.

DETAILED DESCRIPTION OF EXEMPLARY EMBODIMENTS

The matters defined in the description such as a detailed construction and elements are provided to assist in a comprehensive understanding of embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
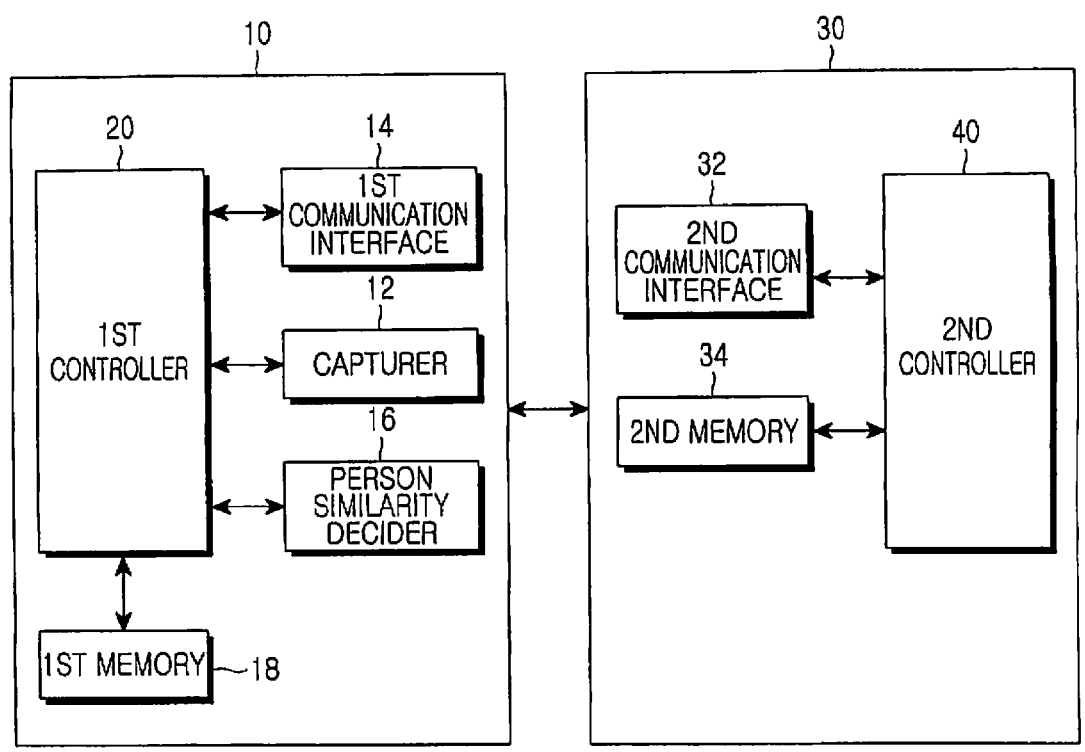
FIG. 1 is a block diagram of a UPnP-based DLNA system according to the present invention.

FIG. 1 is a block diagram of a Universal Plug and Play (UPnP)-based Digital Living Network Alliance (DLNA) system according to the present invention. In accordance with an embodiment, the DLNA system includes a UPnP Audio and Video (AV) control point 10 and a UPnP AV media server 30.

The UPnP AV control point 10 takes a photo upon request of a user and stores the photo in an existing memory. Also, the UPnP AV control point 10 determines a person or persons included in the photo and notifies a device (e.g. mobile phone) of the person or persons included in the photo of a Uniform Resource Identifier (URI) from which the photo may be downloaded. The UPnP AV media server 30 receives the URI having the photo captured by the UPnP AV control point 10, accesses the URI, and downloads the photo from the URI.

In an embodiment, the UPnP AV control point 10 includes a capturer 12, a first communication interface 14, a person similarity decider 16, a first memory 18, and a first controller 20. Preferably, the UPnP AV 10 may be a camera.

Upon receipt of a user input requesting photographing, the capturer 12 of the UPnP AV control point 10 captures an image incident through a lens (not shown), converts the captured image to an image file, and stores the image file. This stored image file is referred to as a 'photo file'.

The first communication interface 14 communicates with the UPnP AV media server 30. In an embodiment, the first communication interface 14 may transmit a URI of the photo file captured by the capturer 12 to the UPnP AV media server 30. Specifically, the first communication interface 14 may transmit a message including the URI of the photo file to the UPnP AV media server 30 under the control of the first controller 20, which will be described later.

When the capturer 12 takes a photo, the person similarity decider 16 determines similarities to persons included in the photo file. The person similarity decider 16 checks the faces of persons captured in the photo by the capturer 12 and compares the faces with faces of persons whose images were previously stored in the first memory 18, thereby determining similarities between the faces of people in the photo to the faces of the persons of the stored images.

The first memory 18 may includes a program memory and a data memory. The first memory 18 stores information needed for controlling the operation of the UPnP AV control point 10. In an embodiment, the first memory 18 may store a photo file captured by the capturer 12. In addition, the first memory 18 may further store image files by which to determine facial similarities to persons captured in a photo.

Specifically, the person similarity decider 16 detects the faces of persons in a captured photo and compares facial image files previously stored in the first memory 18 with the faces in the sensed images, thus determining the similarities between them.

The first controller 20 provides overall control to the UPnP AV control point 10. The first controller 20 selects the UPnP AV media server 30 to which the photo captured by the capturer 12 is to be transmitted, referring to similarities determined by the person similarity decider 16. For example, if it is determined that a person is similar to a person included in the photo by 70% or more, the first controller 20 determines that both persons are the same person. If the similarity is below 70%, the first controller 20 determines that the persons are different. The first controller 20 controls the first communication interface 14 to transmit a URI at which the photo file is available to the UPnP AV media server 30 associated with the person which turned out to be the same person included in the photo.

In accordance with an embodiment, the UPnP AV media server 30 includes a second communication interface 32, a second memory 34, and a second controller 40.

The second communication interface 32 performs a communication function of the UPnP AV media server 30. In an embodiment, the second communication interface 32 accesses the URI received from the UPnP AV control point 10 and downloads the photo from the URI.

The second memory 34 may include a program memory and a data memory. The second memory 34 stores various information needed for controlling the operation of the UPnP AV media server 30. In an embodiment, the second memory 34 may store the photo file downloaded from the URI notified by the UPnP AV control point 10.

The second controller 40 provides overall control to the UPnP AV media server 30. Upon receipt of the URI for photo download from the UPnP AV controller 10, the second controller 40 controls the second communication interface 32 to access the URI.

Figure 2:
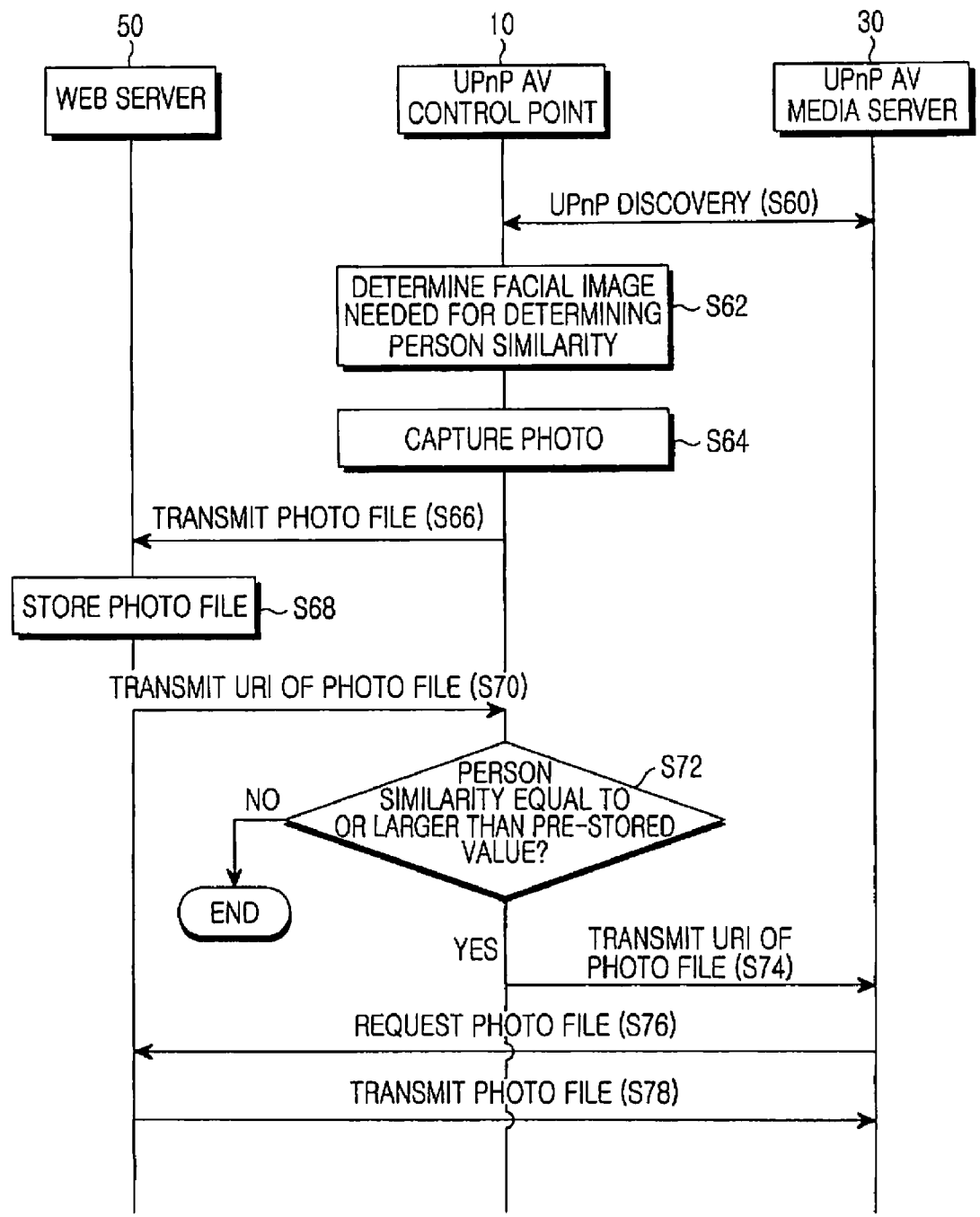
FIG. 2 is a flowchart illustrating a file sharing method in the UPnP-based DLNA system according to an embodiment of the present invention.

FIG. 2 is a flowchart illustrating a file sharing method in the UPnP-based DLNA system according to an embodiment of the present invention.

Referring to FIG. 2, the UPnP AV control point 10 identifies each UPnP AV media server 30 by UPnP discovery in step S60. The UPnP AV control point 10 may request a response to a UPnP AV media server 30 that can communicate with the UPnP AV control point 10 by broadcasting a response request message within its communication range. When a UPnP AV media server 30 notifies the UPnP AV control point 10 that it is available by transmitting a response message, the UPnP discovery is completed. In this manner, the UPnP AV control point 10 may identify each UPnP AV media server 30 within its communication range.

In an embodiment, the UPnP AV control point 10 may also request transmission of an image (i.e. a facial image) of a user using the UPnP AV media server 30 to the UPnP AV media server 30. Thus, the UPnP AV media server 30 may transmit the facial image as an image file of a format such as Joint Photographics coding Experts Group (JPEG), Portable Network graphics (PNG), etc. Hereinbelow, the facial image stored in the form of an image file will be referred to as a 'facial image file'. In an embodiment, the UPnP AV media server 30 may have already stored the facial image file of its user in the second memory 34. Also, the UPnP AV control point 10 may receive a facial image file from each UPnP AV media server 30 during the UPnP discovery and store the facial image files in the first memory 18, or may have already stored the facial image file of each UPnP AV media server 30 in the first memory 18.

Upon completion of the UPnP discovery, the UPnP AV control point 10 determines a facial image required for person similarity determination in step S62. A facial image file is extracted from among all facial image files stored in the first memory 18. To be more specific, the UPnP AV control point 10 extracts the facial image file of the UPnP AV media server 20 in current communication so that a facial image included in a later captured photo is compared with the extracted facial image file to thereby reduce the time taken for determining similarity.

When a photo is taken through the capturer 12 in step S64, the UPnP AV control point 10 transmits the photo file to a web server 50 in step S66. The web server 50 stores the received photo file in step S68 and transmits a URI of the photo file to the UPnP AV control point 10 in step S70.

In general, an image file such as a photo file captured by the UPnP AV control point 10 is transmitted to and stored in the web server 50 in the DLNA system. The UPnP AV control point 10 basically stores a position at which the photo file is stored in the web server 50, that is, a URI of the photo file. In this embodiment, it is assumed that the UPnP AV control point 10 stores both the photo file and the URI in the first memory 18.

The UPnP AV control point 10 determines whether the similarity between the facial image included in the photo file and the facial image file stored in the first memory 18 is greater than or equal to a value pre-stored in the first memory 18 in step S72. When the photo is captured, the similarity decider 16 determines the person similarity between the facial image included in the photo file and the facial image file pre-stored in the first memory 18.

The first controller 20 of the UPnP AV control point 10 selects a UPnP AV media server 30 that will receive the photo file captured in step S64, referring to the person similarity determined by the person similarity decider 16. If the similarity is greater thank or equal to the value pre-stored in the first memory 18 in step S72, the first controller 20 transmits the URI of the photo file to the UPnP AV media server 30 corresponding to the stored facial image file in step S74. On the other hand, if the similarity is less than the pre-stored value in step S72, the first controller 20 may terminate this procedure.

For example, if the pre-stored value is '70%', the first controller 20 transmits the URI of the photo file only to a UPnP AV media server 30 corresponding to a facial image file with a similarity of 70% or higher determined by the person similarity decider 16.

The reason for determining the similarity in this manner is that all of facial images corresponding to all UPnP AV media servers identified during the UPnP discovery are not included in the photo captured by the capturer 12. Since the photo file includes facial images corresponding to part of the identified UPnP AV media servers 30, the photo file has to be transmitted only to UPnP AV media servers corresponding to facial images included in the photo file.

Upon receipt of the URI of the photo file, the UPnP AV media server 30 accesses the web server and requests the photo file to the web server 50 in step S76. The web server 50 transmits the photo file to the UPnP AV media server 30 in step S78. Then the UPnP AV media server 30 stores the received photo file.

Figure 3:
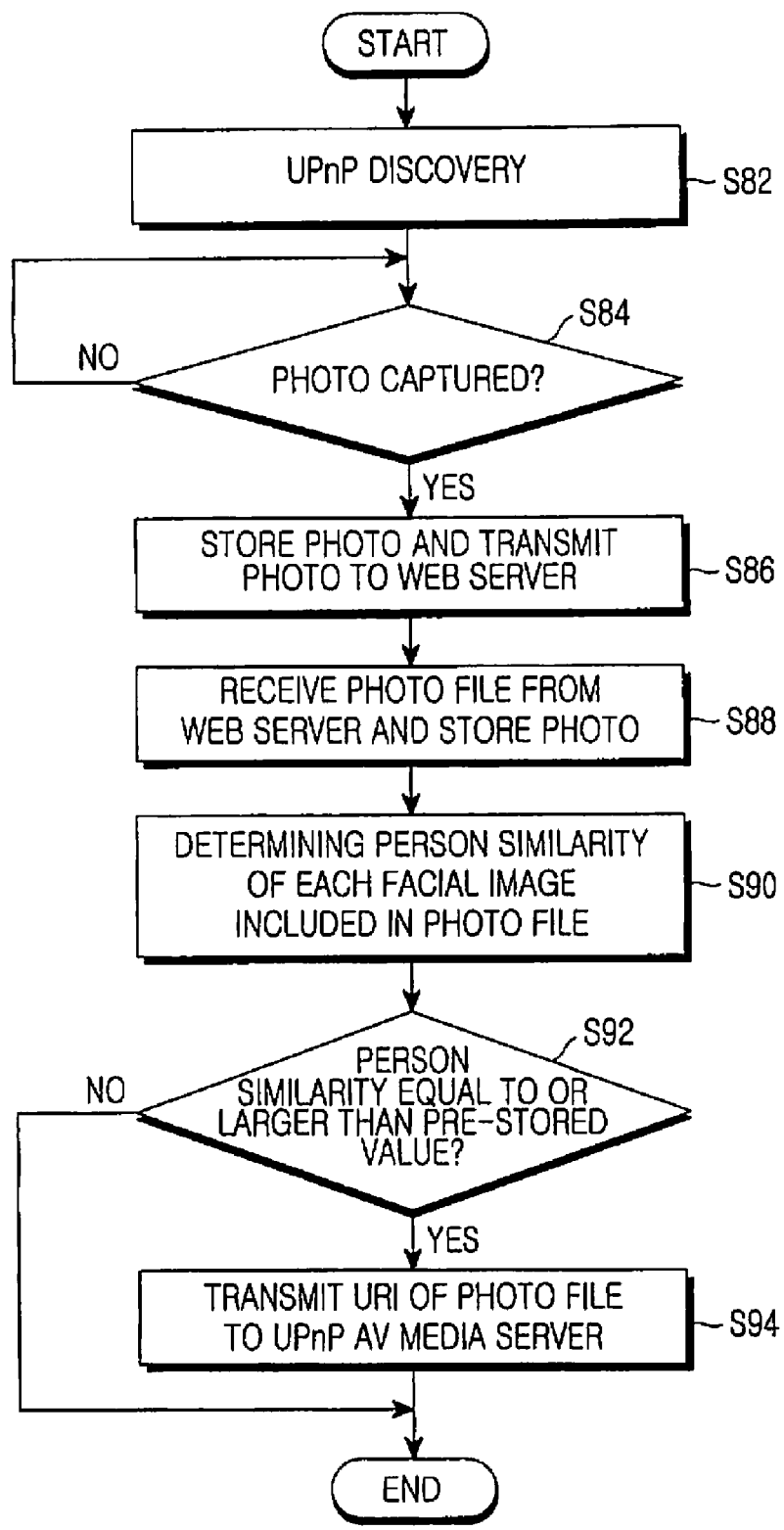
FIG. 3 is a flowchart illustrating a file sharing method of a UPnP AV control point in the UPnP-based DLNA system according to an embodiment of the present invention.

FIG. 3 is a flowchart illustrating a file sharing method of a UPnP AV control point in the UPnP-based DLNA system according to an embodiment of the present invention.

Referring to FIG. 3, the UPnP AV control point 10 determines whether a photo has been taken by the capturer 12 in step S84. If no photo has been captured, the UPnP AV control point 10 is maintained in idle state. On the other hand, if a photo has been captured, the UPnP AV control point 10 stores the captured photo as a photo file and transmits the photo file to the web server 50 in step S86. When the photo file is stored in the web server 50, the web server 50 transmits a URI generated for the photo file to the UPnP AV control point 10. The UPnP AV control point 10 receives the URI of the photo file from the web server 50 and stores the URI in step S88.

The person similarity decider 16 of the UPnP AV control point 10 compares a facial image included in the photo file with a facial image file stored in the first memory 18 and determines the similarity between the facial image and the facial image file in step S90. The first controller 20 of the UPnP AV control point 10 compares the similarity with a pre-stored value in step S92. If the similarity is greater than or equal to the pre-stored value, the first controller 20 transmits the URI of the photo file to a UPnP AV media server 30 corresponding to the facial image file in step S94. On the other hand, if the similarity is less than the pre-stored value, the UPnP AV control point is maintained in the idle state without an additional operation.

It may further be contemplated as another embodiment that the UPnP AV control point 10 does not perform step S84 and compares a facial image included in a photo file pre-stored in the first memory 18 with a facial image file received from each UPnP AV media server 30 identified during the UPnP discovery in step S82. In the same manner as illustrated in FIG. 3, if a similarity is greater than or equal to a pre-stored value, the UPnP AV control point 10 may transmit the URI of the photo file to a UPnP AV media server 30 with the similarity.

Figure 4:
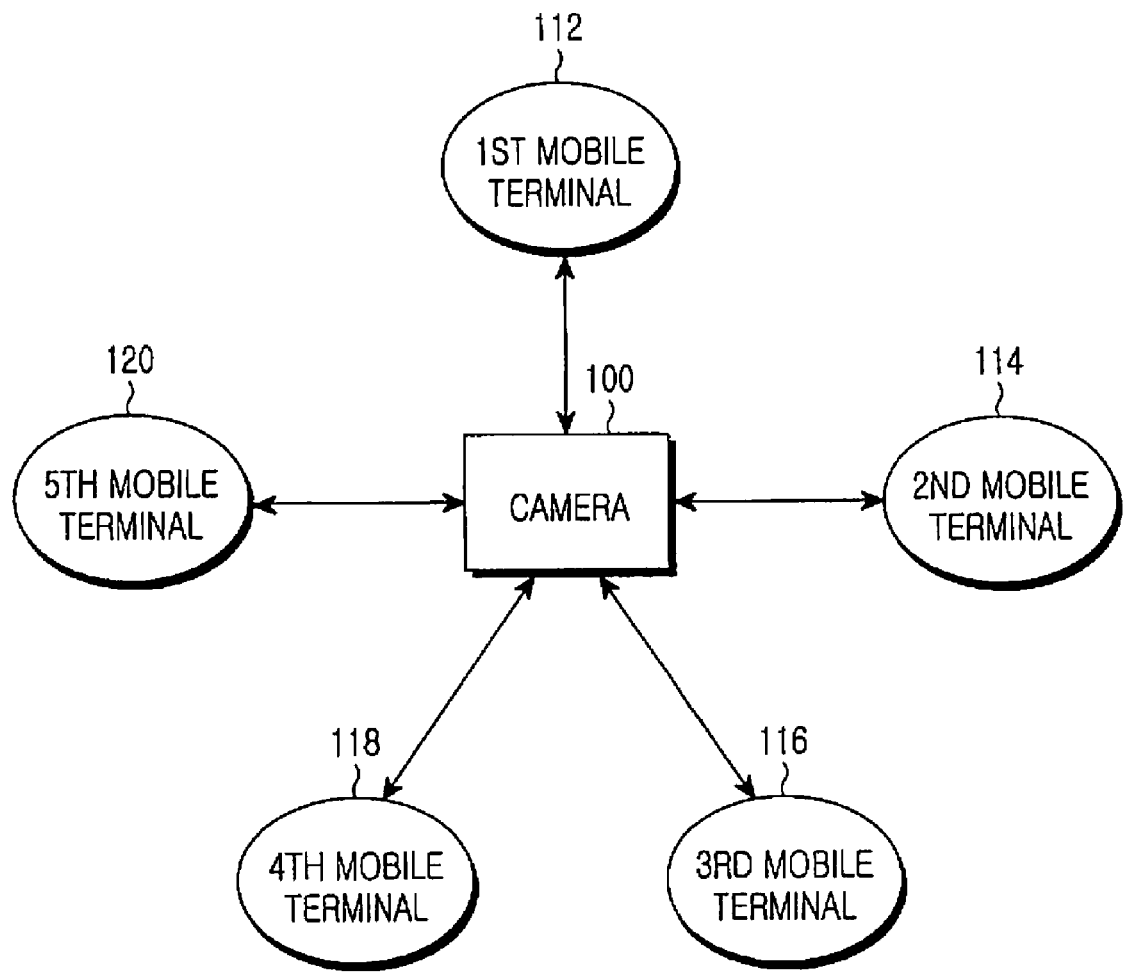
FIG. 4 is a diagram illustrating the UPnP AV control point and a UPnP AV media server in the UPnP-based DLNA system according to an embodiment of the present invention.

FIG. 4 is a diagram illustrating a UPnP AV control point and a UPnP AV media server in the UPnP-based DLNA system according to an embodiment of the present invention.

Referring to FIG. 4, the DLNA system includes a camera 100, a first mobile terminal 112, a second mobile terminal 114, a third mobile terminal 116, a fourth mobile terminal 118, and a fifth mobile terminal 120.

In this embodiment, it is assumed that the camera 100 serves as the UPnP AV control point 10 and executes a UPnP AV control point application. It is also assumed that the first to fifth mobile terminals 112 to 120 serve as UPnP AV media servers 30 and execute a UPnP AV media server application.

On the assumption that a user of the camera 100 takes a photo of users of the first, third and fifth mobile terminals 112, 116 and 120, facial images of the users of the first, third and fifth mobile terminals 112, 116 and 120 may be included in the photo. Facial images may be confined to the faces of the users of the first to fifth mobile terminals 112 to 120.

The camera 100 is aware that the users of the first, third and fifth mobile terminals 112, 116 and 120 have been captured during a similarity decision procedure. If the similarities between of facial images included in the photo and the facial images of the users of the first, third and fifth mobile terminals 112, 116 and 120 are greater than or equal to a value pre-stored in the first memory 18, the camera 100 transmits the URI of the photo file to the first, third and fifth mobile terminals 112, 116 and 120.

As is apparent from the above description of the present invention, since a file is shared between a control point and a media server in a DLNA system, a user can easily share a captured photo with another user.

While the invention has been shown and described with reference to certain embodiments of the present invention thereof, they are mere exemplary applications. For example, while it has been described that the present invention applies to a base device and an auxiliary device, the terms "base" and "auxiliary" are used for the convenience' sake. Therefore, the present invention is applicable to any devices adapted to perform the functions of the base and auxiliary devices. Also, the present is applicable to various radio or wireless communication schemes. Therefore, it will be understood by those skilled in the art that various changes in form and details may be made therein without departing from the spirit and scope of the present invention as defined by the appended claims and their equivalents.

What is claimed is:

1. A method for sharing a file between a control point and a media server in a networking system, the method comprising the steps of:
    capturing a photo;
    transmitting the photo to a web server;
    transmitting, by the web server, a Uniform Resource Identifier (URI), representing a position at which the photo is stored, to the control point;
    determining by the control point a similarity between a facial image included in the captured photo and one of a plurality of facial image files, each corresponding to a respective media server;
    comparing by the control point the similarity with a pre-stored value, and if the similarity is greater than or equal to the pre-stored value, transmitting by the control point the URI to the media server that corresponds to the facial image file; and
    accessing by the media server the URI received from the control point and receiving by the media server the photo from the web server using the URI.

2. The method of claim 1, further comprising discovering the at least one media server by the control point.

3. The method of claim 2, further comprising transmitting a facial image file of a user of the at least one media server to the control point by the at least one media server.

4. The method of claim 3, wherein the similarity determination comprises determining the similarity by comparing the facial image file received from the at least one media server with the facial image included in the captured photo.

5. The method of claim 1, wherein the facial image file corresponding to the at least one media server is previously stored in the control point.

6. A networking system, comprising:
    a control point having a capturer, for when a photo is captured by the capturer, transmitting the photo to a web server, transmitting by the web server a Uniform Resource Identifier (URI), representing a position at which the photo is stored, to the control point, determining a similarity between a facial image included in the captured photo and one of a plurality of facial image files, each corresponding to a respective media server, comparing the similarity with a pre-stored value, and if the similarity is greater than or equal to the pre-stored value, transmitting the URI to the media server that corresponds to the facial image file; and
    the at least one media server for receiving the URI from the control point and accessing the photo from the web server using the URI.

7. The networking system of claim 6, further comprising the web server for receiving the photo from the control point and storing the received photo.

8. The networking system of claim 6, wherein the control point comprises:
    the capturer;
    a person similarity decider for determining the similarity;
    a communication interface for transmitting the URI of the photo to the at least one media server; and
    a controller for comparing the similarity with the pre-stored value, and if the similarity is greater than or equal to the pre-stored value, controlling the communication interface to transmit the URI of the photo to the media server.

9. The networking system of claim 8, further comprising a memory for storing the facial image file corresponding to the at least one media server and the URI of the photo.

10. The networking system of claim 6, wherein the media server comprises a communication interface for accessing the URI and receiving the photo from the memory using the URI.

11. A method for sharing a file with a media server and a control point in a networking system, the method comprising the steps of:
    capturing a photo through a capturer;
    transmitting the photo to a web server;
    transmitting by the web server a Uniform Resource Identifier (URI), representing a position at which the photo is stored, to the control point;
    determining a similarity between a facial image included in the captured photo and one of a plurality of facial image files, each corresponding to a respective media server; and
    comparing the similarity with a pre-stored value, and if the similarity is greater than or equal to the pre-stored value, transmitting the URI to the media server that corresponds to the facial image file.

12. The method of claim 11, further comprising accessing by the media server the URI received from the control point and receiving by the media server the photo from the position at which the photo is stored using the URI.

13. The method of claim 11, further comprising discovering the at least one media server by the control point.

14. The method of claim 13, further comprising transmitting a facial image file of a user of the at least one media server to the control point by the at least one media server.

15. The method of claim 14, wherein the similarity determination comprises determining the similarity by comparing the facial image file received from the at least one media server with the facial image included in the captured photo.

16. The method of claim 11, wherein the facial image file corresponding to the at least one media server is previously stored.

* * * * *